May 10, 1966  D. R. WALKER  3,250,661
REINFORCED MATERIAL AND METHOD OF MAKING THE SAME
Filed Feb. 18, 1958  3 Sheets-Sheet 1

DONALD R. WALKER
INVENTOR.

BY
ATTORNEYS.

May 10, 1966     D. R. WALKER     3,250,661
REINFORCED MATERIAL AND METHOD OF MAKING THE SAME
Filed Feb. 18, 1958     3 Sheets-Sheet 2

DONALD R. WALKER
INVENTOR.

BY
ATTORNEYS.

May 10, 1966   D. R. WALKER   3,250,661
REINFORCED MATERIAL AND METHOD OF MAKING THE SAME
Filed Feb. 18, 1958   3 Sheets-Sheet 3

DONALD R. WALKER
INVENTOR.

BY
ATTORNEYS.

United States Patent Office 3,250,661
Patented May 10, 1966

3,250,661
REINFORCED MATERIAL AND METHOD OF MAKING THE SAME
Donald R. Walker, Reading, Mass., assignor to Avco Manufacturing Corporation, Cincinnati, Ohio, a corporation of Delaware
Filed Feb. 18, 1958, Ser. No. 715,985
5 Claims. (Cl. 161—67)

The present invention relates to reinforced material which is particularly resistant to wear, abrasion, and ablation and to a method of making such material. Material made in accordance with the present invention possesses such desirable characteristics not only at room temperature but also at extremely high temperatures. This attribute renders such materials particularly useful under extreme environmental conditions such as encountered by re-entry vehicles of intercontinental ballistic missiles.

More specifically, the invention concerns reinforced material in which the reinforcement has the form of a rug comprising a backing and pile perpendicular to the backing. In the finished material, the reinforcement is oriented so that the backing is substantially parallel to one face of the material and the pile is perpendicular to the other face. For certain applications, a foundation member may also be bonded intimately to the face of the material adjacent and parallel to the backing of the reinforcement.

In carrying out the present invention, a wide variety of substances may be used to impregnate the reinforcement. The particular substance used is a function of the intended application. The impregnating substance, which when solidified forms a matrix in which the reinforcement is imbedded, may also contain particulate inclusions which are added to enhance the properties of the finished material.

In brief, the preferred embodiment of the present invention comprises a reinforcement in the form of a fiber glass rug which is saturated with a thermosetting resin. The specific type of resin used is not critical except as may be dictated by special applications for which the material is intended. The saturated reinforcement is heat-cured at moderate temperature to form a rigid reinforced material. After curing, the material may be machined, ground or finished by conventional processes.

Briefly, the method of the present invention comprises the steps of supporting the rug reinforcement on a foundation sheet with the backing of the reinforcement resting on the sheet and the pile projecting away therefrom, and introducing resin to the reinforcement through a plurality of perforations formed in the foundation sheet. Impregnation may be accomplished by forcing the resin into the reinforcement either under positive pressure, or under the influence of a vacuum. Since the resin gradually seeps from the backing through the pile, there is no tendency for the pile to be deflected or matted, and the finished material is relatively free of voids caused by entrapped air bubbles.

It has been found by actual experiments that fiber glass reinforced plastic is amazingly resistant to ablation at high temperatures if the glass fibers are oriented normal to the heated surface. This makes it ideally suited for use in so-called "nose cones" or re-entry vehicles which carry the warheads of intercontinental ballistic missiles. Upon re-entering the atmosphere, a nose cone is subjected to a very high rate of heating. Severe ablation of surface layers of the nose cone can occur, rapidly causing destruction, unless special materials are used that can resist the extreme environmental conditions.

Experiments indicate that a plastic nose cone reinforced by glass fibers oriented normal to the outside surface of the nose cone resists ablation very effectively. The phenomenal performance is not well understood but it is generally believed that the plastic matrix dissociates at elevated temperatures producing a gas which washes over the surface of the nose cone and tends to shield it from high velocity air particles which would otherwise generate heat through friction. Even the exposed glass reinforcing fibers soften at the extreme temperatures encountered and may produce a molten layer of material which spreads uniformly over the surface of the nose cone. Some of the glass may even vaporize to supplement the protective gaseous shield. The reduction in heat input, coupled with the low thermal conductivity of the material, preserves the structural integrity of the nose cone and assures satisfactory flight performance.

Orientation of the reinforcing fibers normal to the exterior surface of the nose cone appears to be of fundamental importance for satisfactory performance. For one thing, the fibers, being imbedded in the matrix perpendicular to the surface, are securely anchored and do not wash out of the matrix under the influence of the high velocity air stream. Secondly, the surface of the nose cone remains relatively smooth and does not become irregular as would be the case if reinforcing fibers were exposed parallel to the surface. For this reason, heating, due to surface irregularities, is minimized. Homogeneity of the material is also of importance and is attained by the close-packed glass fibers extending to the surface of the material. Ablation, i.e., severe burning away of surface layers, is significantly reduced.

The present invention provides a simple and effective form of material having the requisite qualities recommending it for use in missile applications. By using a reinforcement in the form of a fiber glass rug, orientation of glass fibers normal to the exposed surface of the nose cone is readily attained. Handling of fibers is simplified as in impregnation of the reinforcing rug by the matrix material. In addition, the backing of the rug presents a strengthening member which imparts strength to the material even when the surface remote therefrom attains very high temperatures.

Although the material is well adapted to use in missile components, it also lends itself readily to numerous other applications, such as in bearings and combustion chamber liners. By using substances other than plastic and glass, a reinforced material can be produced suitable for use in a wide variety of applications where wear, abrasion or ablation resistance are of importance. Such materials will be described in greater detail later in this application.

In view of the foregoing, it is a general object of the present invention to provide an improved form of reinforced material and a method of making the same.

More particularly, it is an object to provide a reinforced material in which the reinforcement includes fibers oriented normal to one face of the material.

Another object of the invention is to provide a material reinforced by fibers oriented normal to one face of the material and strengthened at its other face by a foundation member.

Still another object is the provision of a reinforced material having particulate inclusions of substances which impart preferred qualities to the material.

Other objects of the invention are as follows:
(a) Provision of a reinforcement in the form of a rug having a backing and pile perpendicular thereto.
(b) Provision of a special cavity molding process for impregnating a rug type reinforcement without matting of its pile.
(c) Provision of a fiber glass reinforced plastic for use in high temperature applications such as combustion chambers and re-entry vehicles.

(d) Provision of bearing material including reinforcing fibers oriented normal to its surface.

The novel features that are considered characteristic of the invention are set forth in the appended claims; the invention itself, however, both as to its organization and method, together with additional objects and advantages thereof, will best be understood from the following description of specific embodiments when read in conjunction with the accompanying drawings, in which:

*General description of material*

Figure 1:
FIGURE 1 is a cross-sectional view taken through a reinforcement for use in making material of the present invention.

In FIGURE 1 is illustrated a reinforcement in the form of a rug comprising a backing 1 with which pile 2 is intimately engaged. In general, the backing comprises warp and wool filaments woven as in a conventional domestic carpet to interlock and support the pile substantially perpendicularly to the plane defined by the backing.

Figure 2:
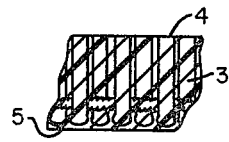
FIGURE 2 is a cross-sectional view of the reinforced material.

This reinforcement is imbedded in a matrix 3 (see FIGURE 2) in such fashion that the pile is oriented perpendicularly to face 4 of the material and the backing is oriented parallel to the opposite face 5 of the material. As will be evident from FIGURE 2, the material is homogeneous near surface 4 with the filaments of the pile relatively evenly spaced in the matrix and oriented perpendicularly to the surface. The backing affords reinforcement in directions perpendicular to the pile.

Figure 3:
FIGURE 3 is a cross-sectional view of a modified form of the material including a foundation member and particulate inclusions.

Referring now to FIGURE 3, a modification of the material is disclosed in which the reinforcement is imbedded in matrix 3, and particles 6, of a substance different from the matrix, are also imbedded in the matrix. By including different types of particles, the characteristics of the finished material can be varied at will. FIGURE 3 also illustrates the provision of a foundation member 7 which is bonded to the face of the material which is adjacent and parallel to the backing of the reinforcement. It will be understood by those skilled in the art that provision of particulate inclusions and a foundation member are not inter-related and may be used together or separately, depending upon the particular application for the material.

The substance used in making the reinforced material can vary widely. For high temperature ablation resistance, it has been found effective to make the reinforcement from glass fibers and to impregnate the reinforcement with a resinous plastic matrix.

The type of resin in itself is not critical and may be of the phenolic, opoxide, melamine, silicone, furane, or other type. For nose cone applications, it has been found effective to use an epoxide resin made from epichlorohydrin and diphenyl propane cured by phthalic anhydride. The preferred method of impregnating the reinforcement with such a plastic will be described later in the application.

It is also deemed effective to make the reinforcement from silicon dioxide for high temperature materials, from asbestos, or from nylon. As is true of the matrix, substances for making reinforcements are chosen with a view toward the ultimate application of the material.

In order to increase the percentage of glass in the material, glass particles may be mixed with the matrix, as described with reference to FIGURE 3. Instead of glass particles, particles of beryllium oxide can be used for high temperature applications, since such particles have a high melting point and a relatively high latent heat of fusion. Another form of particle for ablation resistant materials is magnesium oxide which vaporizes at a temperature of 5500° Fahrenheit. Particles of salts, such as aluminum fluoride, which vaporize or decompose at low temperature, can also be added.

For bearing applications, a fiber glass reinforced resinous matrix may also be used. Performance of the material can be enhanced by the addition of graphite or other lubricating particles which lubricate the surface of the bearing as they are exposed by bearing wear. For underwater bearings, the material may consist of fiber glass reinforced rubber.

The invention also contemplates the formation of high temperature materials by impregnating a suitable reinforcement, made, for instance, of glass or metal, with a matrix of clay or ceramic which can be fired to form a homogeneously reinforced material.

*Specific materials*

Figure 6:
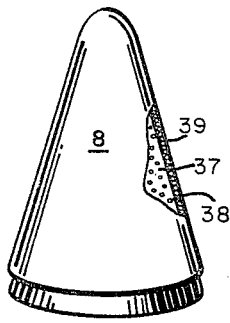
FIGURE 6 shows to a reduced scale a nose cone made of reinforced material, a section of the side wall of the nose cone being broken away to disclose its construction.

A re-entry vehicle or nose cone is shown in FIGURE 6. While re-entering the earth's atmosphere, the surface 8 of the nose cone is subjected to intense heating which may result in ablation of its surface.

A material which is recommended for use in nose cones consists of a fiber glass reinforcement made from a low alkali borosilicate glass which is impregnated with an epoxide resin cured by phthalic anhydride.

Epoxide materials have been successfully made by using 100 parts of Armstrong C–4 epoxy resin to which has been added 37½ parts by weight of Armstrong Activator "J," both made by Armstrong Products Co. of Warsaw, Indiana. After impregnation, the resulting material was cured for 2½ hours at 210° Fahrenheit.

The cured product can easily be machined by carbide-tipped cutting tools.

Material having 60–65% glass by weight is well suited for use in nose cone applications, although this weight ratio should not be considered a critical limitation of the material. The proportion by weight can be controlled to a large extent by the density of the pile of the reinforcing rug. Further, the proportion of glass present can be increased through the addition of glass particles to the matrix resin.

Fabrication of the reinforcing rug from silicon dioxide is also recommended for nose cones and similar applications. As mentioned earlier in the application, beryllium oxide and magnesium oxide particles can also be added to high temperature materials.

Figure 7:
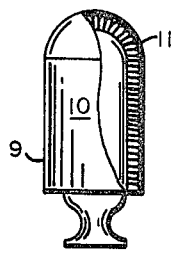
FIGURE 7 shows an elevational view of a combustion chamber for a rocket engine, the side wall of the chamber being broken away to show its interior construction.

Another particular application of such high temperature materials is illustrated in FIGURE 7. This illustrates a combustion chamber 9 for a rocket engine having an outer metallic wall 10 within which a fiber glass reinforced plastic material 11 is provided as a liner. It will be noted that the filaments of the pile extend radially inwardly toward the center of the combustion chamber and are disposed substantially normal to the interior surface.

It will be understood by those skilled in the art that the liner of such a combustion chamber operates at extremely high temperature and must also be abrasion and ablation resistant. Combustion chambers of gas turbine engines can be built in much the same fashion.

Figure 8:
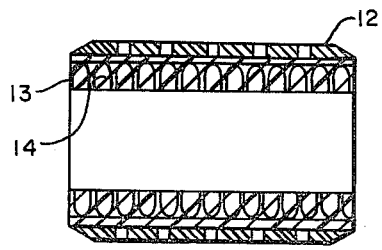
FIGURE 8 is a longitudinal sectional view through a plain bearing made in accordance with the present invention.

In FIGURE 8 is illustrated a plain bearing formed within a metallic sleeve 12 which serves as a foundation member. As illustrated, the bearing comprises a rug type reinforcement 13 which is impregnated by a resin matrix 14. The pile of the reinforcement extends radially inwardly and is substantially normal to the interior cylindrical surface of the bearing. The matrix material may be bonded to the metallic shell of the bearing as will be described shortly. A modification of the bearing illustrated in FIGURE 8 consists of the addition of graphite particles to the matrix material. These lubricate the surface of the bearing as it is worn away to expose the particles.

The reinforced material is ideally suited for bearings since it is extremely stiff in radial directions parallel to the pile but is more yielding in directions perpendicular to the pile.

*Description of method*

Figure 4:
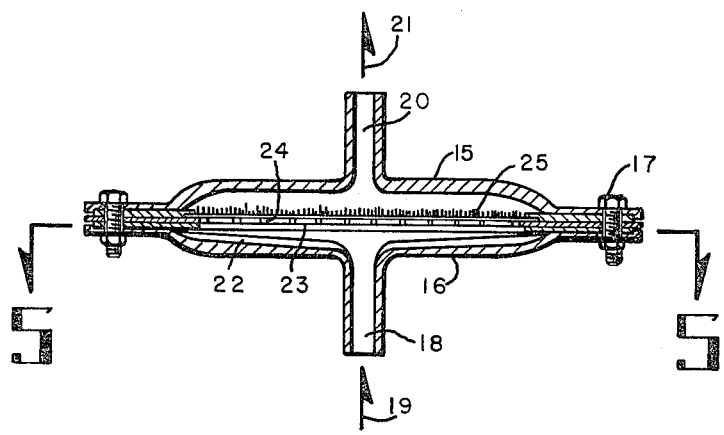
FIGURE 4 is a cross-sectional view of a device for impregnating the reinforcement.
Figure 5:
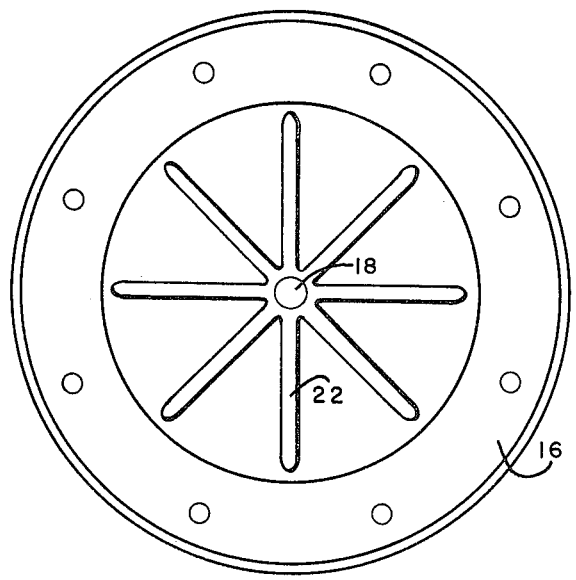
FIGURE 5 is a view of the lower half of the device taken on plane 5—5 of FIGURE 4.

The preferred method of making the reinforced material of this invention consists of fabricating the reinforcement in the form of a rug and introducing the matrix material through the backing in a direction parallel to the filaments of the pile. This will be well understood with reference to FIGURE 4 which shows a device for fabricating the material. The device consists of an upper half 15 and a lower half 16, which are tightly clamped together, as by bolts 17, at their peripheries. The shape of the device in plan view can be adapted to the particular type and shape of material desired. For illustrative purposes, it is shown to be circular in shape, as illustrated by FIGURE 5.

The lower half of the device includes an inlet 18 through which liquid resin may be introduced, as indicated by arrow 19. The resin can be caused to flow through the inlet either by pressure positively applied to it, or through evacuation of the upper half of the device through outlet 20, such as indicated by the arrow 21. Either way, the resin will be caused to rise in the lower half of the device until it is distributed by gates 22 uniformly underneath foundation plate 23. This plate, which may be made of stainless steel or any other metallic or non-metallic material, is perforated as indicated at 24. Through these perforations the liquid resin is introduced to the rug type reinforcement 25 which rests upon the foundation plate with its backing adjacent the plate and its pile extending perpendicularly away therefrom.

The foundation plate may be shaped as needed to form pieces of material that do not lie in a single plane.

As the resin gradually rises through the backing and pile of the reinforcement, air is displaced from the reinforcement and an intimate wetting of all of the filaments of the reinforcement is assured. It is desirable not to feed the plastic up through the pile at too fast a rate lest air bubbles be entrapped and voids created in the finished material. Should such bubbles be present, it may be desirable to recirculate the plastic up through the reinforcement until all of the air bubbles are removed.

After the reinforcement is thoroughly saturated, the inlet 18 can be plugged and the entire chamber placed in an oven for polymerizing the liquid resin. After the material has cured, the bolts 17 can be removed and the foundation sheet 23, with the reinforced plastic material adhered thereto, can be removed and machined to final form.

Should it be desirable to produce reinforced material without a foundation member, it is merely necessary to coat the foundation member with a release material. Common ones frequently used are wax and polyvinyl alcohol.

As will be understood by those skilled in the art, the foregoing is a novel modification of the cavity molding technique which is frequently used for impregnating mat-type reinforcing material with plastic. It will also be understood that prior to the introduction of the resin, it is desirable to de-size the reinforcement if it is made of fiber glass. This is preferably done through heat treatment of the material since it leaves a minimum residue of size and also is very effective in driving off moisture, the presence of which will interfere with the bonding of the resin to the fiber glass. After de-sizing, it is desirable to apply a finish such as methacrylato chromic chloride to the fiber glass to enhance bonding of the resin to the fibers. Various types of finishes are commercially available and are well-known.

Figure 9:
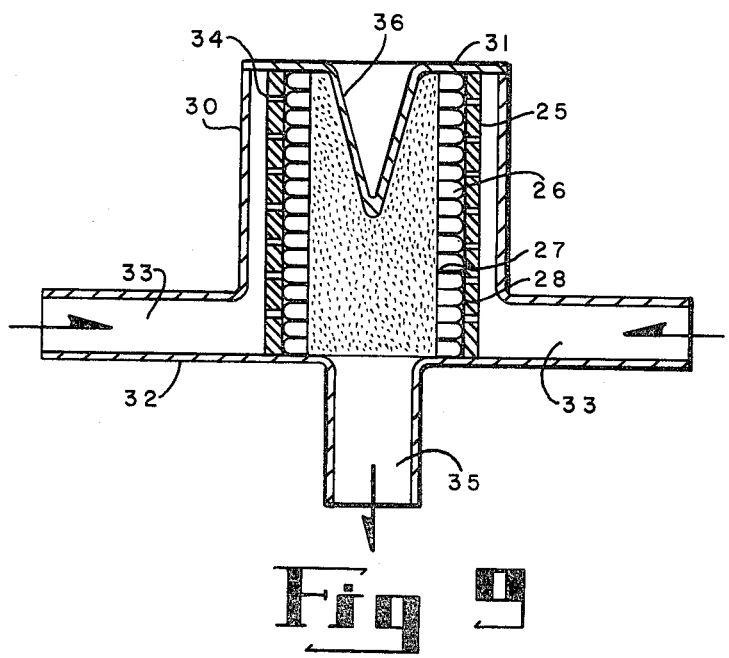
FIGURE 9 is a diagrammatic showing of a device for performing the method of this invention in making bearings.

FIGURE 9 illustrates a device for forming cylindrical bearings. Shown at 25 is a rigid foundation cylinder within which a reinforcing rug 26 is disposed with its pile 27 extending radially inwardly and its backing 28 adjacent the inner surface of the cylinder. The cylinder is enclosed in housing 30 and is clamped between top wall 31 and bottom wall 32. Liquid resin is introduced through a plurality of side inlets 33 so that the resin distributes evenly around the cylinder. It seeps through perforations 34 of the cylinder, through the backing of the reinforcement and radially inward through the pile. Excess resin may leave the housing by outlet 35.

The operation resembles that described with reference to FIGURE 4. The reinforcement is thoroughly saturated without matting of the pile.

Re-entrant wall 36 may be provided to conserve resin which would otherwise occupy the space within the bearing.

An excellent analysis of conventional methods of making reinforced plastic will be found in the text "Glass Reinforced Plastics," edited by Phillip Morgan and published in the United States by Philosophical Library, Inc. (second edition 1957).

*Forming reinforced material*

As will be understood from the foregoing, the reinforced material can be bonded securely to a foundation member, such as illustrated at 7 in FIGURE 3. The foundation member can be provided for additional strength purposes or can be provided to facilitate the formation of the reinforced material in a particular configuration. Thus, in FIGURE 6, the nose cone 8 is shown as including a foundation member 37 which is perforated at 38. The reinforced material is bonded to the foundation member with the pile 39 of the reinforcement extending outwardly away from and perpendicular to the foundation member, as described earlier. In this application, the foundation member, which may be stainless steel, aids in holding the reinforcement prior to impregnation. The reinforcement necessarily must be relatively flexible to conform to the contour of the foundation member. Similarly, in FIGURE 7 a metallic shell 10, forming the outer wall of the combustion chamber, may be provided to support the inner reinforcement while it is being impregnated. Again, the bearing in FIGURE 8 includes a metallic sleeve 12 which may serve as the foundation member.

It will be understood that the provision of the foundation member is optional. It may be made of a metal or non-metal suitably chosen with due regard for the coefficient of expansion of the matrix and its curing temperature.

Flexibility of the reinforcing rug can be improved by weaving it so that the backing includes a certain percentage of nylon or other stretchable fibers. For extreme flexibility in one direction, all of the warp or all of the woof threads may be made of nylon. The flexibility imparted by the nylon also makes it possible to increase the density of the pile since the backing may be stretched as the rug is woven. After weaving, the release of the backing crowds the pile densely together.

For special applications, it may be desirable to make the entire reinforcement, both backing and pile, of nylon. This material also vaporizes to provide a protective gaseous layer at the surface of the material when subjected to high temperature.

It should be understood that the particular weave of the rug does not in way way constitute a limitation of the present invention. For many applications, the backing of the rug would be a balanced weave so that the rug would have equal strength in all directions perpendicular to the pile. This is not necessary, however, and other special backing weaves can be used to attain a type and degree of flexibility that is suited to the final product being fabricated.

Summary

In view of the foregoing, it will be understood that this invention provides an improved reinforced material in which the reinforcement resembles a rug having pile perpendicular to the backing. It will also be understood that the particular substance from which the reinforcement is made, or which is used to impregnate the reinforcement, may be varied widely, depending upon the particular use for which the finished material is intended.

A simple method is also described which not only facilitates elimination of air from the reinforcement while it is impregnated, but also guarantees that the pile of the reinforcement will not be deflected or matted. In this way, orientation of the pile normal to one face of the finished material is assured.

The various features and advantages of the invention are thought to be clear from the foregoing description. Other features and advantages not specifically enumerated, will undoubtedly occur to those versed in the art, as likewise will many variations and modifications of the particular embodiments of the invention, which are illustrated, all of which may be achieved without departing from the spirit and scope of the invention as defined by the following claims.

I claim:

1. A sheet of reinforced ablation-resistant material comprising a reinforcement including a support and pile attached to and extending substantially perpendicularly from said support, said reinforcement being made from a siliceous substance and being substantially completely embedded in a solid matrix with said pile disposed substantially perpendicular to one face of the sheet.

2. Material as defined in claim 1, and in addition, particulate solid inclusions in said matrix.

3. An ablation-resistant material having opposed substantially parallel faces comprising a siliceous reinforcement in the form of a rug having a planar backing and pile extending perpendicularly therefrom, said reinforcement being substantially completely embedded in a solidified matrix with said backing parallel to one face of said matrix and said pile perpendicular to the other face thereof.

4. A material as defined in claim 3 in which said siliceous reinforcement is made from fiber glass and said matrix comprises a polymerized resin.

5. A material as defined in claim 4 and, in addition, particulate solid inclusions in said matrix.

References Cited by the Examiner

UNITED STATES PATENTS

| | | | |
|---|---|---|---|
| 1,828,397 | 10/1931 | Dreyfus | 8—131 |
| 2,060,113 | 11/1936 | Platt | 8—131 |
| 2,128,087 | 8/1938 | Gatke | 308—238 |
| 2,358,204 | 9/1944 | Bird | 154—76 |
| 2,409,307 | 10/1946 | Patch | 102—92.5 |
| 2,468,820 | 5/1949 | Goddard | 102—92.5 |
| 2,600,321 | 6/1952 | Pyle. | |
| 2,614,058 | 10/1952 | Francis | 102—56 X |
| 2,675,337 | 4/1954 | Walker et al. | 154—76 |
| 2,748,446 | 6/1956 | Mason | 28—74 |
| 2,749,266 | 6/1956 | Eldred | 154—81 |
| 2,835,107 | 5/1958 | Ward | 60—35.6 |
| 2,887,346 | 5/1959 | Gaugler | 308—238 |
| 2,921,360 | 1/1960 | Foster | 28—74 |

FOREIGN PATENTS

| | | |
|---|---|---|
| 757,890 | 9/1956 | Great Britain. |

OTHER REFERENCES

Jet Propulsion, vol. 26, No. 11, November 1956, pages 969–972.

BENJAMIN A. BORCHELT, *Primary Examiner.*

SAMUEL BOYD, ARTHUR M. HORTON, SAMUEL FEINBERG, *Examiners.*

C. C. WELLS, W. J. NELSON, G. H. GLANZMAN, *Assistant Examiners.*